United States Patent [19]

Delrue et al.

[11] Patent Number: 5,234,978
[45] Date of Patent: Aug. 10, 1993

[54] COMPOSITION CONTAINING A POLYMER OF UNSATURATED HYDROCARBON, A C1-4 ALKYL OR HYDROXYALKYLETHER OF STARCH AND A VINYL OR ACRYL POLYMER AS A COMPATIBILIZING AGENT

[75] Inventors: Rita M. Delrue, Bergen op Zoom; Anton L. German, Eindhoven; Henricus E. H. Meijer, Veldhoven; Antonius H. Zijderveld, Vaassen; Jan Bussink, Bergen op Zoom, all of Netherlands

[73] Assignee: Cargill, Incorporated, Minneapolis, Minn.

[21] Appl. No.: 744,943

[22] Filed: Aug. 14, 1991

[30] Foreign Application Priority Data

Aug. 15, 1990 [NL] Netherlands .................. 9001826

[51] Int. Cl.$^5$ ................................. C08J 0/00
[52] U.S. Cl. ........................ 524/53; 524/47; 524/52; 524/388
[58] Field of Search .............. 524/53, 388, 47, 52

[56] References Cited

U.S. PATENT DOCUMENTS

| | | |
|---|---|---|
| 2,458,191 | 1/1949 | Nichols, Jr. et al. ............ 260/17.4 |
| 3,117,014 | 1/1964 | Klug ..................... 106/213 |
| 3,117,021 | 1/1964 | Klug ..................... 117/104 |
| 3,706,731 | 12/1972 | Hjermstad .................. 260/233.3 R |
| 3,949,145 | 4/1976 | Otey et al. .................. 428/423 |
| 3,976,605 | 8/1976 | Matsunaga et al. ........... 260/2.5 HA |
| 3,992,496 | 11/1976 | Matsunaga et al. ........... 264/48 |
| 4,016,117 | 4/1977 | Griffin ................. 260/17.4 ST |
| 4,021,338 | 5/1977 | Harkin .................. 210/63 R |
| 4,045,388 | 8/1977 | Matsunaga et al. ......... 260/17.4 ST |
| 4,125,495 | 11/1978 | Griffin ................. 260/17.4 ST |
| 4,133,784 | 1/1079 | Otey et al. ............ 260/17.4 ST |
| 4,156,666 | 5/1979 | Odate et al. ............. 260/23 H |
| 4,337,181 | 6/1982 | Otey et al. .............. 523/128 |
| 4,464,202 | 8/1984 | Andres et al. ............. 106/139 |
| 4,863,655 | 9/1989 | Lacourse et al. ........... 264/53 |
| 5,095,054 | 3/1992 | Lay et al. ............... 524/53 X |

FOREIGN PATENT DOCUMENTS 0032802 7/1981 European Pat. Off. .
0157643 12/1980 Japan ..................... 524/53

OTHER PUBLICATIONS

Otey, Westhoff and Russel "Biodegradable Films from Starch and Ethylene-Acrylic Acid Copolymer" 16 *Ind. Eng. Chem., Prod. Res. Dev.* at 305-308 (1977).

Otey, Westhoff and Doane "Starch-Based Blow Films" 19 *Ind. Eng. Chem. Prod. Res. Dev.* at 592-595 (1980).

*Encycl. Polym. Sci. Technology* Suppl. No. 2, at 665-699, preferably at 665-669, (1977).

Bagley, Fanta, Burr, Doane and Russell "Graft Copolymers of Polysaccharides with Thermoplastic Polymers. A New Type of Filled Plastic " 17 *Polym. Eng. Sci.* at 311-316 (1977).

Ray-Chaudhuri "Grafter Starch Acylates and their Properties": 21 *Die Starke* at 47-52 (1969).

Otey, Westhoff and Russell "Biodegradable films from starch and ethylene-acrylic acid copolymer" 87 *Plastics Manuf.* at 33 (1977) 87:185424d.

Griffin and Mivetchi "Biodegradation of ethylene/vinylacetate copolymers" 87 *Plastics Manuf.* at 13 (1977) 87:23921m.

*Primary Examiner*—Joseph L. Schofer
*Assistant Examiner*—J. M. Reddick
*Attorney, Agent, or Firm*—Fitch, Even, Tabin & Flannery

[57] ABSTRACT

A composition comprising a polymer of an unsaturated hydrocarbon, a $C_{1-4}$ alkyl or hydroxyalkylether of starch having a degree of substitution of at least 0.25, and a polyhydric aliphatic alcohol having 2 to 10 carbon atoms and 2 to 6 hydroxyl groups wherein the compatibilizing agent can be a vinyl copolymer, acrylic copolymer and mixtures thereof. The composition can be used in the preparation of biodegradable plastics.

10 Claims, No Drawings

COMPOSITION CONTAINING A POLYMER OF UNSATURATED HYDROCARBON, A C1-4 ALKYL OR HYDROXYALKYLETHER OF STARCH AND A VINYL OR ACRYL POLYMER AS A COMPATIBILIZING AGENT

This invention relates to a composition containing a polymer of unsaturated hydrocarbon, a $C_{1-4}$ alkyl or hydroxyalkylether of starch having a degree of substitution of at least 0.25 and a vinyl or acryl polymer as a compatibilizing agent.

Dutch patent application 8902321, which is not a prior publication, discloses a composition which contains a polymer of unsaturated hydrocarbon and a $C_{1-4}$ alkyl or hydroalkyl starch ether having a degree of substitution of at least 0.25 for improving the biodegradability, and furthermore a compatibilizing agent. A vinyl or acryl copolymer is used as the compatibilizing agent, in particular, a copolymer of ethylene and vinyl acetate (EVA) or a copolymer of ethylene and acrylic acid (EAA). In this way, a relatively high percentage of starch derivative can be incorporated into the material. From these compositions, objects and in particular packaging films can be made. According to said Dutch application it is preferred to add a higher carboxylic acid, such as stearic acid, oleic acid or di-oleic acid, as a plasticizer or lubricant; said carboxylic acid also acts as a dispersant.

According to this invention, the present composition also contains a polyhydric aliphatic alcohol having 2-10 carbon atoms and 2-6 hydroxyl groups as a dispersant/plasticizer/lubricant for the starch ether. The alcohol has a better dispersing action than the carboxylic acid used in Dutch patent application 8902321. The alcohol provides better properties in terms of strength, elasticity and film forming, compared to the use of carboxylic acid as disclosed in Dutch application 8902321.

DE-A-1,470,846 discloses a combination of an alkyl or hydroxyalkyl starch ether, specifically a hydroxyethyl starch ether or a hydroxypropyl starch ether, having the above mentioned degree of substitution, an alcohol such as propylene glycol, diethylene glycol or glycerine as a plasticizer therefore, as well as water in an amount of 1-20% by weight. However, this reference does not mention a hydrocarbon polymer or any other polymer to be used in combination with the starch derivative, and therefore, also a compatibilizing agent is not disclosed. Furthermore, in contrast to the present application, water has to be present according to this reference.

This invention also relates to a process for preparing such a composition, as well as to products which have been made by means of this composition or with the use of said process.

As in Dutch application 8902321, the polymers of unsaturated hydrocarbons to be used are in the first place polyolefins, such as the different kinds of polyethylene and polypropylene, and furthermore polystyrene, as well as copolymers of these unsaturated hydrocarbons; in particular, ethylene polymers are used.

As in Dutch application 8902321, the degree of substitution of the etherfied starch should be at least 0.25 and preferably 0.4-1.0, while the preferred starch ethers are hydroxypropyl ethers, obtained by condensation of starch with propylene oxide. As is also disclosed in this reference, this condensation is preferably carried out using alkaline catalysis, in particular with NaOH, whereby a statistic distribution of the products occurs.

The purpose of the etherification is to decrystalize the starch grains and to disrupt the hydrogen bonds between the starch molecules, whereby the rigid structure vanishes. By using elevated temperatures and friction forces the etherified starch grains can be easily disintegrated. The disintegrated material, when combined with plasticizers, already per se has the possibility to form plastic films, and in combination with the polymer of unsaturated hydrocarbon the starch ether does not or at least nor primarily function as a filler, but forms a copolymer with the hydrocarbon polymer.

As polymers of unsaturated hydrocarbons enter into consideration in the first place polyolefins such as polyethylene (both high pressure and low pressure polyethylene) and polypropylene, as well as polystyrene and copolymers of these unsaturated hydrocarbons.

Alkyl and hydroxyalkyl ethers of starch are known compounds. Depending on the choice of the alkyl or hydroxyalkyl group and the degree of etherification the hydrophility of the starch derivative can be adjusted. However, all these ethers have in common that they form entirely or mainly a copolymer with the hydrocarbon polymer.

For the present purpose the degree of substitution of the etherified starch should be at least 0.25. Preferably, the degree of substitution is higher, suitably at 0.4-1.0. On the other hand a too high degree of substitution is disadvantageous for the degradability and for this reason the degree of substitution preferably is not higher than 2.

Among the starch ethers it is now preferred to use hydroxypropyl ethers which is obtained by condensation of starch with propylene oxide. These products are already known for a number of decades. They are prepared in accordance with the general principles of the condensation of compounds having an active hydrogen, e.g. a hydroxy group, with alkylene oxides. Therein basic or acid catalysis is possible but for starch derivatives basic catalysis is preferred. As the basic catalyst one can simply and cheaply use NaOH. Of course, substitution at several hydroxy groups of the starch can occur, and also the introduced hydroxypropyl group may react further with further molecules of propylene oxide. As is well known, in such condensation reactions with basic catalyst usually a statistic distribution is established. The hydroxypropylation of starch has been described in more detail in "Modified Starches: Properties and Uses," Editor O. B. Wurzburg, M. S., CRC Press, Inc., Boca Raton, Fla., U.S.A., chapter 6, by J. V. Tuschhoff.

As in Dutch application 8902321, copolymers of ethylene and vinyl acetate (EVA) or of ethylene and acrylic acid (EAA) are preferably used as compatibilizing vinyl or acryl copolymers. Furthermore, terpolymers of ethylene, vinyl acetate and (meth)acrylic acid can be mentioned.

Examples of the polyhydric alcohol used in this invention as dispersant/plasticizer/lubricant are ethylene glycol, propylene glycol, glycerine, butylene glycol, diethylene glycol, pentaerythritol and dipentaerythritol. Ethylene glycol, propylene glycol and pentaerythritol are preferred, and of these compounds ethylene glycol is most preferred.

The present polyhydric alcohols are used in amounts which cause to swell or partially dissolve the starch ether, and they should not be used in such a large amount that a complete dissolution is achieved. For example, the preferred hydroxypropyl starch dissolves in ethylene glycol in an amount of 30% at 75° C. and in propylene glycol in an amount of 40%, while this compound dissolves in glycerol in an amount of 10% at 100° C.

Preferably 20-70% by weight of polymer of unsaturated hydrocarbon, 20-80% by weight of starch ether, 11-19% by weight of compatibilizing copolymer and 2 to 8% by weight of polyhydric alcohol is used in the composition of this invention.

Because processing the mixture always involves a heating step, the polyhydric alcohol can completely develop its swelling or partially dissolving action.

A preferred process for preparing the present composition comprises extruding together the starch ether and the polyhydric alcohol and thereafter mixing the thus-obtained homogenous mixture with the other components and extruding said mixture.

Although the invention is not dependent on or restricted by theoretical considerations, it is believed that the hydrogen bondings of the starch are disrupted by the etherification, whereafter the polyhydric alcohol causes a further disentanglement of the starch molecules, so that the starch particles are present independently of each other and can be substantially completely molecularly dispersed. Sometimes this leads to clear beads when the starch ether and the polyhydric alcohol are extruded together.

The composition of this invention is excellently suitable for the manufacture of films, but also of three-dimensional objects. Furthermore, starch ethers and the polyhydric alcohol used are cheap materials, cheaper than the hydrocarbon polymer. A perfect composition containing 50% of starch ether can be obtained easily, and also higher percentages of starch ether are suitable. Of course, the optimal percentage of starch ether will also depend on the use of the composition.

The following non-limiting example illustrates this invention.

EXAMPLE I

A mixture of hydroxypropyl starch having a degree of substitution of 0.5% and 10% by weight of ethylene glycol, based on the starch, was extruded at 75° C. and clear beads were thus obtained. 55 parts by weight of the beads were admixed with 15 parts by weight of EAA and 30 parts by weight of low density polyethylene (LLDPE). This mixture was extruded and films were made. These films had a tensile strength of 12.6 MPa/mm$^2$ (about 50% of the value of LLDPE as such) and a yield value of 12.3, as compared to only 10.1 for polyethylene as such. Furthermore, the film showed an elongation at break of 330%. This combination of properties makes the film outstandingly suitable as packaging film, which has the additional advantage of being biodegradable.

EXAMPLE II

Two mixtures A and B of linear low pressure polyethylene (LLDPE), hydroxypropyl starch (HPS) having a degree of substitution of 0.5% and EAA (ethylene acrylic acid copolymer) as a compatibilizing agent and stearic acid were prepared. The compositions of the mixtures are indicated in the table below. The mixtures were heated to 180° C. in an extruder and extruded to form granulates, and the granulates were made into films by extrusion-blowing. Composition A could not be made into a film. Furthermore, two mixtures C, and D, having the same compositions as A and B, respectively, except that these mixtures contained 5 parts by weight of glycol instead of 5 parts by weight of stearic acid, were prepared and made into films according to the same procedure.

TABLE

|  | parts by weight | | | |
|---|---|---|---|---|
|  | *A | *B | C | D |
| LLDPE | 30 | 50 | 30 | 50 |
| HPS | 50 | 30 | 50 | 30 |
| EAA | 15 | 15 | 15 | 15 |
| Stearic acid | 5 | 5 | — | — |
| Glycol | — | — | 5 | 5 |
| Tensile strength, MPa/mm$^2$ | —[1)] | 18.9 | 12.3 | 14.6 |
| Elongation at break, % | —[1)] | 360 | 330 | 640 |

*Comparative Composition.
[1)]Composition A could not be made into films.

As appears from the above table, composition A, which contained stearic acid, could not be made into films, while composition C, which is identical to composition A except for the fact that C contains glycol instead of stearic acid, could be made into films having desirable properties.

Composition D, containing glycol, has a better balance of properties than composition B, which differs from composition D in that B contains stearic acid instead of glycol.

EXAMPLE III

The following 2 mixtures were prepared and made into films using the method of example II. The HPS, EAA and LLDPE were the same as in the previous examples.

|  | parts by weight | |
|---|---|---|
|  | 1[a)] | *2 |
| HPS | 50 | 50 |
| Ethylene glycol | 5 | — |
| Glycerol | — | 5 |
| EAA | 15 | 15 |
| LLDPE | 30 | 30 |
| Tensile strength, MPa/mm$_2$ | 12.3 | 9.8 |
| Elongation at break, % | 330 | 280.0 |

*Comparative Composition.
[a)]Composition 1 is identical to composition C in example II.

What is claimed is:

1. A composition containing a polymer of an unsaturated hydrocarbon, a $C_{1-4}$ alkyl or hydroxyalkyl ether of starch having a degree of substitution of at least 0.25 and a compatibilizing agent that is a copolymer selected from the group consisting of ethylene-vinyl acetate, ethylene-acrylic acid, vinyl acetate-(meth)acrylic acid, and terpolymers of ethylene-vinyl-acetate-(meth)acrylic acid, wherein the composition also contains a polyhydric aliphatic alcohol having 2-10 carbon atoms and 2-6 hydroxyl groups as a dispersant/plasticizer/lubricant for the starch ether.

2. A composition according to claim 1, wherein the polyhydric alcohol is ethylene glycol, propylene glycol or glycerine.

3. A composition according to claim 1, wherein the hydrocarbon polymer is an ethylene polymer.

4. A composition according to claim 1, wherein the composition contains a condensation product of starch and propylene oxide as said starch ether.

5. A composition according to claim 1, wherein the starch ether has a degree of substitution of 0.4-1.0.

6. A composition according to claim 1, wherein the composition contains polyethylene as said unsaturated hydrocarbon, hydroxy propyl starch as said starch ether, ethylene-acrylic acid copolymer as said compatabilizing agent and ethylene glycol as said alcohol.

7. A composition according to claim 7, wherein the polyethylene is a linear low density polyethylene.

8. A composition according to claim 1, wherein the composition contains 20-70% by weight of polymer of unsaturated hydrocarbon, 20-80% by weight of starch ether, 11-19% by weight of compatibilizing agent and 2-8% by weight of polyhydric alcohol.

9. A composition according to claim 6, wherein the starch ether has a degree of substitution of 0.4-1.0.

10. A composition according to claim 9, wherein said composition contains 20-70% by weight of polymer of unsaturated hydrocarbon, 20-80% by weight of starch ether, 11-19% by weight of compatibilizing agent and 2-8% by weight of polyhydric alcohol.

* * * * *

UNITED STATES PATENT AND TRADEMARK OFFICE
CERTIFICATE OF CORRECTION

PATENT NO. : 5,234,978
DATED : August 10, 1993
INVENTOR(S) : Delrue et al.

It is certified that error appears in the above-indentified patent and that said Letters Patent is hereby corrected as shown below:

Title page, item [56] 12th reference, References Cited, change the issue date from "1/1079" to --1/1979--.

Column 2, 5th reference, Other Publications, change "Grafter" to --Grafted--.

Column 2, 2nd reference, Other Publications, change "Blow" to --Blown--.

Claim 7, Column 5, line 8, change the dependency from "7" to --6--.

Signed and Sealed this

Twenty-first Day of March, 1995

Attest:

BRUCE LEHMAN

*Attesting Officer*　　　　*Commissioner of Patents and Trademarks*